US008347401B2

(12) United States Patent  
Werner et al.

(10) Patent No.: US 8,347,401 B2  
(45) Date of Patent: Jan. 1, 2013

(54) METHOD AND SYSTEM FOR ENSURING A SHARING VIOLATION FREE ENVIRONMENT FOR A TRUSTED SOFTWARE AGENT

(75) Inventors: Eran Werner, Raanana (IL); Elad Zucker, Netanya (IL)

(73) Assignee: McAfee, Inc., Santa Clara, CA (US)

( * ) Notice: Subject to any disclaimer, the term of this patent is extended or adjusted under 35 U.S.C. 154(b) by 931 days.

(21) Appl. No.: 11/976,399

(22) Filed: Oct. 24, 2007

(65) Prior Publication Data

US 2009/0113526 A1   Apr. 30, 2009

(51) Int. Cl.  
*G06F 7/04* (2006.01)

(52) U.S. Cl. .......................................................... 726/27

(58) Field of Classification Search ...................... 726/27, 726/4  
See application file for complete search history.

(56) References Cited

U.S. PATENT DOCUMENTS

| 4,435,766 | A | * | 3/1984 | Haber et al. | 710/200 |
| 5,161,227 | A | * | 11/1992 | Dias et al. | 718/104 |
| 2001/0039548 | A1 | * | 11/2001 | Shinkai et al. | 707/201 |

OTHER PUBLICATIONS

Collins English Dictionary, Harpers Collins Publishers 2000, Definition of Intercept, http://www.credoreference.com/entry/hcengdict/intercept.*

* cited by examiner

*Primary Examiner* — Cordelia Zecher  
(74) *Attorney, Agent, or Firm* — Wong, Cabello, Lutsch, Rutherford & Brucculeri, LLP

(57) ABSTRACT

A method and system is provided by which a trusted software agent can perform in a sharing violation free environment, which reduces complexity and eliminates interference with applications. A method for handling sharing violations in a computer system comprises intercepting a request by an application for access to a file, capturing a sharing violation raised by the operating system due to the said request, determining whether the sharing violation is due to the trusted agent, and if so holding the request by the application for access to the file until the trusted agent no longer holds the file, and then reprocessing the request by the application for access to the file. The application is not aware that the sharing violation due to the trusted agent occurred, or that the request was pending and reprocessed as at the end of the process it receives a file handle as if a sharing violation did not occur.

22 Claims, 5 Drawing Sheets

METHOD AND SYSTEM FOR ENSURING A SHARING VIOLATION FREE ENVIRONMENT FOR A TRUSTED SOFTWARE AGENT

BACKGROUND OF THE INVENTION

1. Field of the Invention

The present invention relates to a method and system for providing a sharing violation free environment for a trusted software agent that monitors file I/O operations and file manipulations done by other applications.

2. Description of the Related Art

A trusted software agent component typically relies on I/O file operations of other applications and examines files written by these applications. Such an agent can be found in fields such as anti-virus applications or data loss prevention agents. The agent is triggered to scan files, usually as a result of a file operation executed on the same files by another arbitrary application. Typically, such applications tend to perform a sequence of low level file operations, which can be regarded as a high level file save operation. Each low level operation may trigger the agent to examine the file, while the application may still request further access to the file. This situation may lead to sharing violations between the agent and the applications manipulating the files. While the agent can be designed to gracefully handle sharing violations, this situation can seriously damage the behavior of other applications in use.

For example, the problem may be caused when a user application requests exclusive rights to a file during the time that the agent is already holding the file. Some agent applications, especially anti-virus applications, have a strict solution—when the agent identifies that another application requests a file that it is using, it will either immediately release the file (allowing the application to continue) or force the application to wait, by delaying the return of the file handle. This solution is possible since the agent installs a file filter driver that can track create file requests by both the agent and by other applications. The two main drawbacks of this traditional solution are that the agent and application will handle the requests in a sequential, non concurrent manner, even if a sharing violation is not inevitable, and that the agent's file filter driver is required to realize that the same file is in use by the agent and other applications. This requirement, which may seem simple at first glance, is in fact very complicated. Files can be accessed using various file names due to symbolic links, shortcuts, relative paths, etc. The agent's file filter driver is required to resolve all requests in a manner which will ensure the recognition of different requests to the same files.

Thus, the traditional approach is complex and can interfere with the normal operation of applications. A need arises for a technique by which an agent can perform in a sharing violation free environment, which reduces complexity and eliminates interference with applications.

SUMMARY OF THE INVENTION

The present invention provides a method and system by which an agent can perform in a sharing violation free environment, which reduces complexity and eliminates interference with applications. This solution allows concurrent access of both the agent and other applications to the same files as long as a sharing violation does not occur. The applications do not need to wait for the agent to complete examining the files unless a sharing violation actually occurs, and only if the sharing violation is indeed caused because the trusted agent is handling the same file as the application itself. Furthermore this approach is simple, robust, does not require complex mapping of the file system and provides a much better throughput by reducing application waiting time. This solution is not restricted only to data loss prevention or anti-virus applications; it can also benefit scanning/indexing applications and other applications that require real time analysis of files.

A method for handling sharing violations in a computer system comprises intercepting a request by an application for access to a file, capturing a sharing violation raised by the operating system in response to the said request, determining whether the sharing violation occurred due to the trusted agent and in that case queuing the application file access request until the trusted agent completes processing the file and then reprocessing the application's file access request.

When a sharing violation occurs in response to an application's file access request, it can be determined if it has occurred due to the trusted agent. This is done by counting the agent file accesses triggered by applications and examining the appropriate counter at the time a sharing violation is raised. The agent maintains a counter per each application triggering the agent, which counts active file handles used by the agent and that are triggered by the application. When the counter is greater than zero it implies that the agent is handling files due to an operation previously performed by the application which the counter refers to. At such time, if a sharing violation is raised due to a file handle request by the same application if could be determined with high confidence that the sharing violation is caused by the trusted agent. The present invention will queue the application file access request and reprocess it later. If an application file access request raises a sharing violation while the relevant agent counter is zero, it implies that the agent is not holding any files requested by the application and that the sharing violation was definitely not due to the trusted agent but rather due to a collision between two arbitrary applications, and in that case the sharing violation will be raised to the application requesting the file without any intervention. The method may further comprise signaling the trusted agent that the file system has raised a sharing violation for an application file access request and that the violation is due to the trusted agent. The method may further comprise determining when the trusted agent no longer has access to the files requested the other application when the appropriate counter value is zero and reprocessing the application file access request previously queued.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
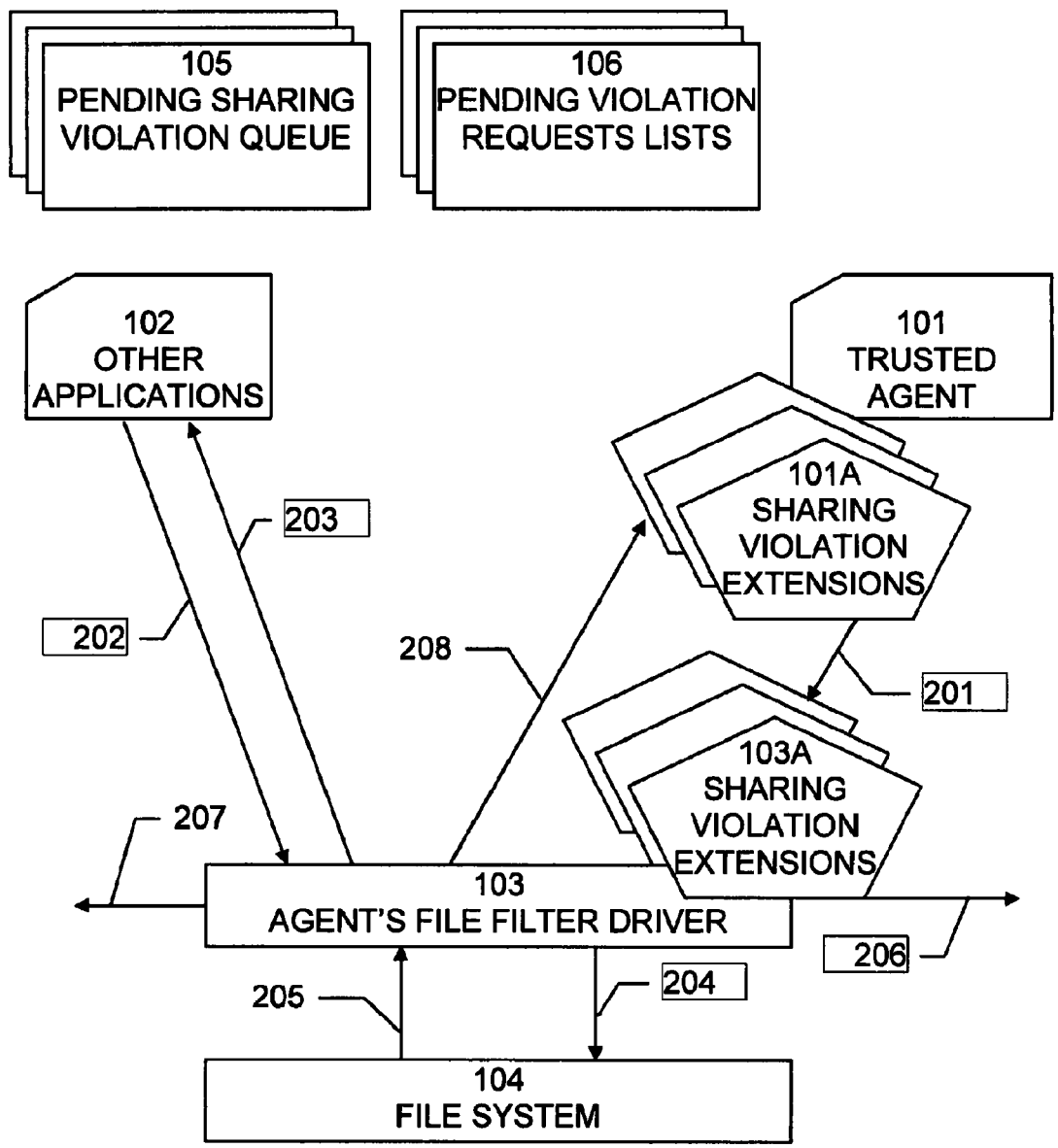
FIG. 1 is an exemplary block diagram of a software system, such as in a host computer system, in which the present invention may be implemented.

A software system 100 in which the present invention may be implemented is shown in FIG. 1. System 100 includes trusted agent 101, other applications 102, file filter driver 103 for trusted agent 101, file system 104, pending sharing violation queues 105, and pending violation requests lists 106. Trusted agent 101 is a software component that tracks files written by other applications 102. Agent 101 has sharing violation extensions 101A, which are data structure that store information about file handles used by the agent and triggered by the application. The agent maintains an instance of this data structure per each application that triggers the agent file access requests. Sharing violation extensions 101A interact with complementary sharing violation extensions 103A installed with the agent's file filter driver 103. The underlying file system 104 receives the access requests from the file filter driver 103 and may occasionally raise a sharing violation.

File system 104 is software for storing and organizing computer files and the data they contain to provide the capability to find and access the files. Typically, file systems are considered part of the operating system of the computer. File systems may use a data storage device such as a hard disk or CD-ROM and involve maintaining the physical location of the files. More formally, a file system is a set of abstract data types that are implemented for the storage, hierarchical organization, manipulation, navigation, access, and retrieval of data. File filter driver 103 is a driver that adds value to or modifies the behavior of another driver-specifically, file system 104. File filter driver 103 can filter I/O operations for one or more file systems or file system volumes. Depending on the nature of the driver, file filter driver 103 can log, observe, or modify file system events, or the filter can even prevent file system events from occurring.

The agent's file filter driver 103 uses two types of data structures; pending sharing violation queues 105 and potential violating request lists 106. The data structures including sharing violation queue 105, potential violation request list 106, sharing violation extension 101A, and sharing violation extension 103A are all implemented so that the have instances per each lock type. In a preferred embodiment, the data structures are replicated for each application (the application inducing the agent request is used as a representative to map the appropriate data structure), while other possible implementations can store these structures per file system mount or other lock types.

Figure 2:
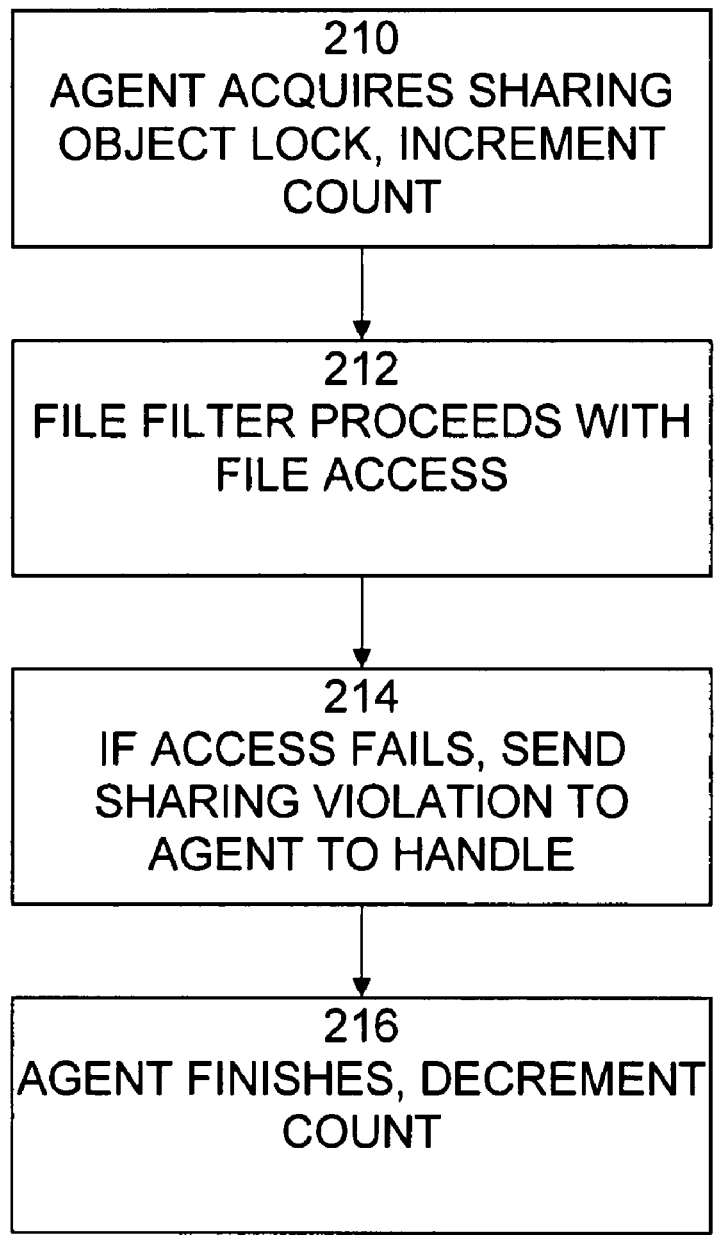
FIG. 2 is an exemplary flow diagram of a process of monitoring agent file access.

A trusted agent's file access process 200 is shown in FIG. 2. It is best viewed in conjunction with FIG. 1. In step 209 an application file access triggers the agent to also access the file. In step 210, when the agent 101 needs to open the file 201, it uses the appropriate sharing violation extension 101A to acquire a sharing object lock. The sharing object increases a reference count, which holds the number of agent file access requests currently being processed and that were all triggered by the same application. This value is non negative, and can be greater than one if there are several agent threads. In step 212, the agent's file filter driver 103 proceeds with the file access request 204 by sending the request to the underlying file system. This request may fail, resulting in a sharing violation 205, if the other application has already acquired exclusive sharing access for the file. In this case, in step 214, the file filter driver 103 propagates 208 the sharing violation to the agent which is responsible for gracefully handling this error. This type of failure is not a concern since it is not causing other applications to fail and may be handled by the trusted agent. In step 216, once the agent finishes processing the file and disposes the file handle, the sharing extension's appropriate reference counter is decreased.

Figure 3:
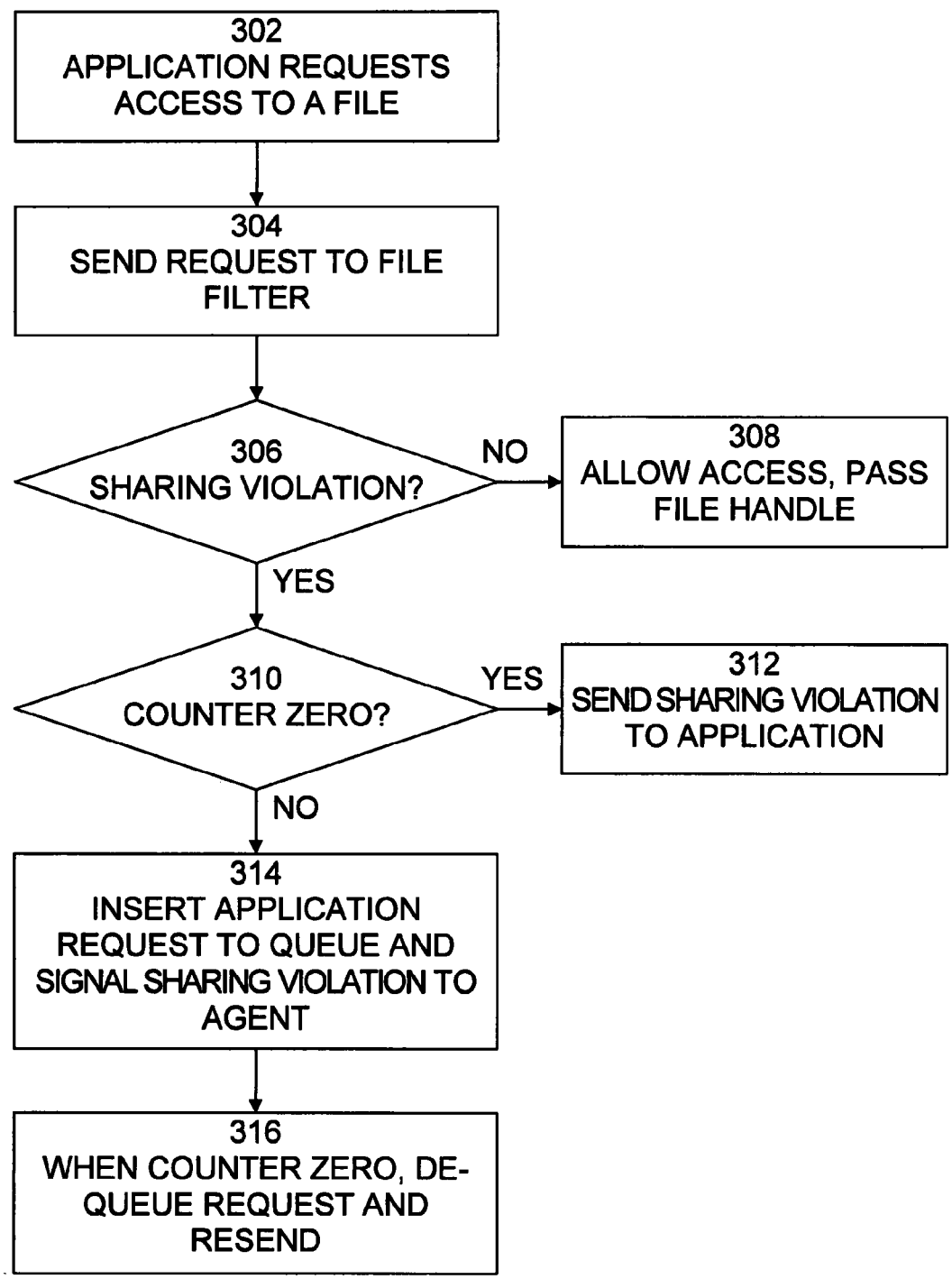
FIG. 3 is an exemplary flow diagram of a process of handling other application's file access requests.

A process 300 of handling other application's file access requests is shown in FIG. 3. It is best viewed in conjunction with FIG. 1. The process begins with step 302, in which, an arbitrary application requests access to a file. In step 304, the request is passed 202 through the agent's file filter driver 103, since the driver 103 is installed at the file filter driver stack. In step 306, the agent's file filter driver 103 captures possible sharing violations 205 raised by the operating system (file system) 104. If no sharing violation is raised, then, in step 308, the access is allowed without interference and file filter driver passes the file handle 203 to the requesting application 102.

If, in step 306, a sharing violation is raised, then in step 310, it is determined whether the application specific sharing object reference counter is zero at that time. If so, it means that the agent is not processing the same file, but rather another arbitrary application was causing the sharing violation. In this case, in step 312, the file filter driver 103 will propagate the sharing violation to the requesting application, since the violation was not triggered by the trusted agent. However, in step 310, if at the time the sharing violation was raised, the reference counter is greater than zero, the file filter driver must take action as this indicates with high probability a sharing violation caused by the trusted agent. In this case, in step 314, the file filter driver 103 will insert the application request 206 to the appropriate pending sharing violation queue 105. Once the agent 101 finishes processing the file, it releases the sharing object lock, reducing the reference counter. In step 316, when the reference counter is reduced to zero a de-queue is performed from the pending sharing violation queue 105. A file access request, made earlier by an application and failed due to a sharing violation, is now resent 204 to the file system 104. Since the agent is not processing the same file at this time, the request may either succeed and a file handle will be returned to the requesting application, or a sharing violation may be raised, but in this case it is definitely not caused by the trusted agent. The application eventually receives the requested file handle and cannot distinguish between the case were the file handle was gained immediately and the case were the request invoked a sharing violation, was queued and eventually reprocessed. The intercept/capture/determine/queue/reprocess sequence is masked from the requesting application. Consequently sharing violations induced by the trusted agent are never realized by other applications and does not interrupt with their work.

Preventing Starvation

Once a file handle request issued by an application causes a sharing violation, and the sharing violation is caused by the agent, the request is inserted 206 into the pending sharing violation queue 105. At this time it is important to signal the agent that it is causing a sharing violation. This is done, in step 314, by raising a sharing violation event using the file filter driver and agent's sharing violation extensions. Once a sharing violation event is raised, the agent will be blocked from requesting additional file access requests that require the same sharing object and will only be allowed to release the sharing object lock. This mechanism is intended to reduce application waiting time by assuring that the agent minimizes file access requests once it is interfering with other applications.

Race Condition

Figure 4:
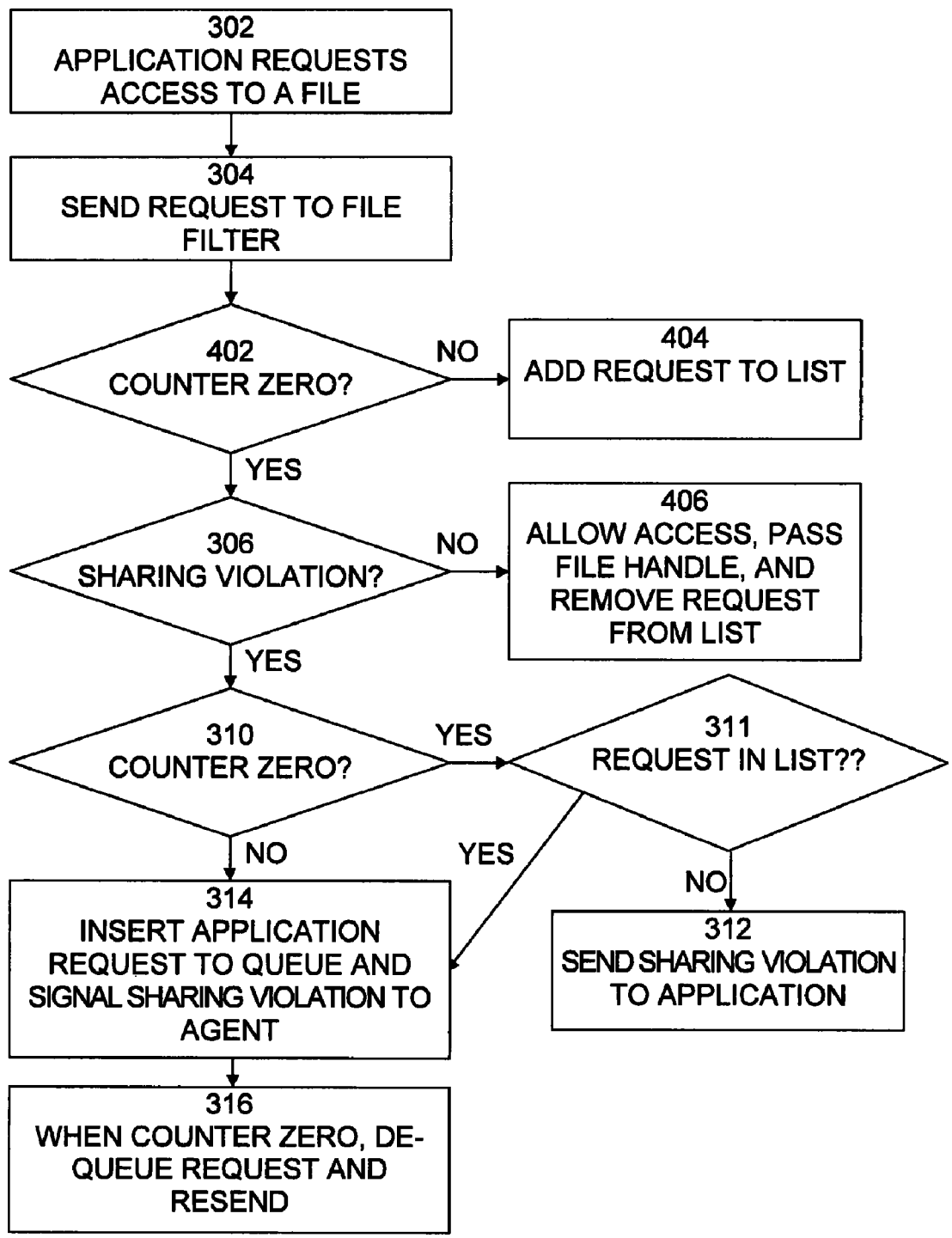
FIG. 4 is an exemplary flow diagram of a process of handling other application's file access requests using a potential violation request list.
Figure 5:
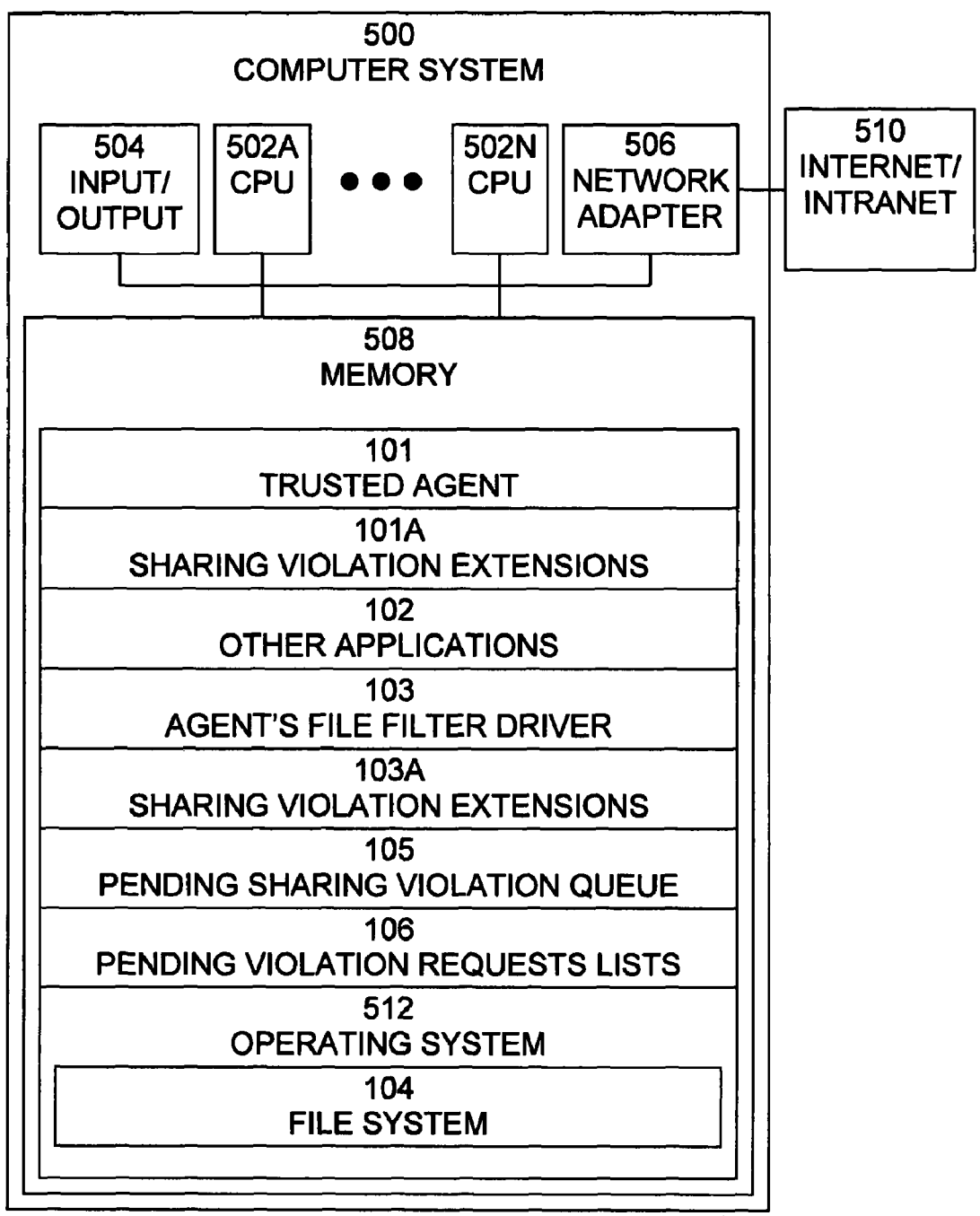
FIG. 5 is an exemplary block diagram of a computer system, in which the present invention may be implemented.

A possible race condition can be caused in the following scenario: An application requests access to a file which is used by the trusted agent. The operating system raises a sharing violation, but before the file filter driver 103 is able to establish that the sharing violation is induced by the trusted agent, a context switch allows the agent to reduce the sharing object reference count to zero. In this case the file filter driver will not realize that the sharing violation was caused because of the trusted agent, and therefore the application's request will fail, instead of being sent to the pending queue for reprocessing. The solution to the described scenario is the use of the potential violation request list 106, as shown in FIG. 4. The purpose of potential violation request list 106 is to store the state of the sharing violation object at the time the request was passed to the file system (allowing the file filter driver to use this information later). When an application requests access to a file, step 302, the file filter driver checks if the appropriate sharing object reference count is non zero, step 402. In this case, in step 404, the request is added to the potential sharing violation list 207 before being sent to the file system in step 306. If, in step 306, the file system returns the request successfully, then in step 406, it is removed from the list. However, if a sharing violation is returned, and the sharing object reference count is zero, the presence of the request in the list indicates that the sharing violation was probably caused by the trusted agent. In this case, in step 314, the file filter driver 103 will insert the application request 206 to the appropriate pending sharing violation queue 105. Once the agent 101 finishes processing the file, it releases the sharing object lock, reducing the reference counter. In step 316, when the reference counter is reduced to zero a de-queue is performed from the pending sharing violation queue 105. A file access request, made earlier by an application and failed due to a sharing violation, is now resent 204 to the file system 104. If at step 310 the counter is zero, the pending request list is checked 311 to determine if the request was added to the list in step 404. If so, then step 314 is followed as the sharing violation was probably due to the trusted agent and the request is removed from the list. If the request is not in the list, the sharing violation is sent to the application in step 312 as the sharing violation was not caused by the agent. An exemplary block diagram of a computer system 500, in which the present invention may be implemented, is shown in FIG. 5. Computer system 500 is typically a programmed general-purpose computer system, such as a personal computer, workstation, server system, and minicomputer or mainframe computer. Computer system 500 includes one or more processors (CPUs) 502A-502N, input/output circuitry 540, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present invention also contemplates embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces computer system 500 with Internet/intranet 510. Internet/intranet 510 may include one or more standard local area network (LAN) or wide area network (WAN), such as Ethernet, Token Ring, the Internet, or a private or proprietary LAN/WAN.

Memory 508 stores program instructions that are executed by, and data that are used and processed by, CPUs 502A-N to perform the functions of computer system 500. Memory 504 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 508 varies depending upon the function that computer system 500 is programmed to perform. In the example shown in FIG. 5, memory 508 includes trusted agent 101, sharing violation extension 101A, other applications 102, file filter driver 103 for trusted agent 101, sharing violation extension 103A, file system 104, pending sharing violation queue 105, pending violation requests lists 106, and operating system 512. Trusted agent 101 is a software component that tracks file I/O of other applications 102. Agent 101 has a sharing violation extension 101A, which is a data structure that stores information about to sharing violations relating to agent 101. Sharing violation extension 101A interacts with a complementary sharing violation extension 103A installed with the agent's file filter driver 103. Sharing violation extension 103A is a data structure that stores information about to sharing violations relating to the agent's file filter driver 103. File system 104 is software for storing and organizing computer files and the data they contain to provide the capability to find and access the files. Typically, file system 104 is are part of operating system 512. The agent's file filter driver 103 uses two data structures—a pending sharing violation queue 105 and a potential violating request list 106. Operating system 512 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include storage media, examples of which include, but are not limited to, floppy disks, hard disk drives, CD-ROMs, DVD-ROMs, RAM, and, flash memory, as well as transmission media, examples of which include, but are not limited to, digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for handling sharing violations in a computer system comprising:
    intercepting a request by an application directed to a file in a file system of an operating system for access to the file;
    capturing a sharing violation issued by the operating system in response to the request;
    determining whether the sharing violation was due to a trusted agent, the determination based at least in part on whether a count of the trusted agent's file access requests triggered by the application is greater than zero, wherein the trusted agent is a software agent configured to monitor file operations performed on the computer system;
    storing the application's file access request in a queue if the sharing violation was due to the trusted agent; and
    reprocessing the request by the application for access to the file when the trusted agent releases the file.

2. The method of claim 1, further comprising signaling the trusted agent that the sharing violation due to the trusted agent has occurred.

3. The method of claim 1, further comprising determining that the trusted agent no longer has access to the file when the count equals zero.

4. The method of claim 3, wherein the act of reprocessing the request by the application for access to the file comprises:
    removing the request by the application for access to the file from the queue; and
    resending the request by the application for access to the file.

5. The method of claim 1, wherein the act of determining whether the sharing violation was due to the trusted agent comprises:
    making the determination that the count is greater than zero prior to capturing the sharing violation issued by the operating system and, based on the determination, adding the request by the application for access to the file to a list;
    making a second determination, after capturing the sharing violation issued by the operating system, of whether the count of requests for access by the trusted agent to the file is greater than zero; and
    determining that the sharing violation is due to the trusted agent when the request is in the list or the count is greater than zero after the second determination is made.

6. The method of claim 5, further comprising signaling the trusted agent that the sharing violation due to the trusted agent has occurred.

7. The method of claim 5, further comprising determining that the trusted agent no longer has access to the file when the count equals zero.

8. The method of claim 7, wherein the act of reprocessing the request by the application for access to the file comprises:
    removing the request by the application for access to the file from the queue and from the list; and
    resending the request by the application for access to the file.

9. A system for handling sharing violations in a computer system comprising:
    a processor operable to execute computer program instructions;
    a memory operable to store computer program instructions executable by the processor; and
    computer program instructions stored in the memory and executable to cause the processor to:
        intercept a request by an application directed to a file in a file system of an operating system for access to the file;
        capture a sharing violation issued by the operating system in response to the request;
        determine whether the sharing violation was due to a trusted agent, the determination based at least in part on whether a count of the trusted agent's file access requests triggered by the application is greater than zero, wherein the trusted agent is a software agent configured to monitor file operations performed on the computer system;
        store the application's file access request in a queue if the sharing violation was due to the trusted agent; and
        reprocess the request by the application for access to the file when the trusted agent releases the file.

10. The system of claim 9, further comprising instructions to cause the processor to signal the trusted agent that the sharing violation due to the trusted agent has occurred.

11. The system of claim 9, further comprising instructions to cause the processor to determine that the trusted agent no longer has access to the file when the count equals zero.

12. The system of claim 11, wherein the instructions to cause the processor to reprocess the request by the application for access to the file comprise instructions to cause the processor to:
    remove the request by the application for access to the file from the queue; and
    resend the request by the application for access to the file.

13. The system of claim 9, wherein the instructions to cause the processor to determine whether the sharing violation was due to the trusted agent comprise instructions to cause the processor to:
    make the determination that the count is greater than zero prior to executing the instructions to cause the processor to capture the sharing violation issued by the operating system and, based on the determination, add the request by the application for access to the file to a list;
    make a second determination, after completing the capture of the sharing violation issued by the operating system, of whether the count of requests for access by the trusted agent to the file is greater than zero; and determine that the sharing violation due to the trusted agent occurs when the request is in the list or the count is greater than zero when the second determination is made.

14. The system of claim 13, further comprising instructions to cause the processor to signal the trusted agent that the sharing violation due to the trusted agent has occurred.

15. The system of claim 13, further comprising instructions to cause the processor to determine that the trusted agent no longer has access to the file when the count equals zero.

16. The system of claim 15, wherein the instructions to cause the processor to reprocess the request by the application for access to the file comprise instructions to cause the processor to:
remove the request by the application for access to the file from the queue; and
resend the request by the application for access to the file.

17. A computer program product for handling sharing violations in a computer system comprising:
a non-transitory computer readable storage medium;
computer program instructions, recorded on the computer readable storage medium and executable by a processor, to cause the processor to:
intercept a request by an application directed to a file in a file system of an operating system for access to the file;
capture a sharing violation issued by the operating system in response to the request;
determine whether the sharing violation was due to a trusted agent, the determination based at least in part on whether a count of the trusted agent's file access requests triggered by the application is greater than zero, wherein the trusted agent is a software agent configured to monitor file operations performed on the computer system;
determine that a count of the trusted agent's file access requests triggered by the application is greater than zero;
store the application's file access request in a queue if the sharing violation was due to the trusted agent; and
reprocess the request by the application for access to the file when the trusted agent releases the file.

18. The computer program product of claim 17, further comprising instructions to cause the processor to signal the trusted agent that the sharing violation due to the trusted agent has occurred.

19. The computer program product of claim 17, further comprising instructions to cause the processor to determine that the trusted agent no longer has access to the file when the count equals zero.

20. The computer program product of claim 19, wherein the instructions to cause the processor to reprocess the request by the application for access to the file comprise instructions to cause the processor to:
remove the request by the application for access to the file from the queue; and
resend the request by the application for access to the file.

21. The computer program product of claim 17, wherein the instructions to cause the processor to determine whether the sharing violation was due to the trusted agent comprise instructions to cause the processor to:
make the determination that the count is greater than zero, prior to capturing the sharing violation issued by the operating system and, based on the determination, adding the request by the application for access to the file to a list;
make a second determination, after capturing the sharing violation issued by the operating system, of whether the count of requests for access by the trusted agent to the file is greater than zero; and
determine that the sharing violation is due to the trusted agent when the request is in the list or the count is greater than zero when the second determination is made.

22. The computer program product of claim 21, further comprising instructions to cause the processor to signal the trusted agent that the sharing violation due to the trusted agent has occurred.

* * * * *